(12) United States Patent
Chang

(10) Patent No.: US 12,554,163 B2
(45) Date of Patent: Feb. 17, 2026

(54) OPTICAL FILM COMPRISING A SECOND OPTICAL LAYER HAVING A PLURALITY OF OPTICAL PORTIONS LOCATED IN RECESSES OF A FIRST OPTICAL LAYER AND DISPLAY DEVICE USING THE SAME

(71) Applicant: CM VISUAL TECHNOLOGY CORPORATION, Tainan (TW)

(72) Inventor: Hsin Wen Chang, Tainan (TW)

(73) Assignee: CM VISUAL TECHNOLOGY CORPORATION, Tainan (TW)

( * ) Notice: Subject to any disclaimer, the term of this patent is extended or adjusted under 35 U.S.C. 154(b) by 922 days.

(21) Appl. No.: 17/451,001

(22) Filed: Oct. 15, 2021

(65) Prior Publication Data

US 2023/0118595 A1  Apr. 20, 2023

(51) Int. Cl.
*G02F 1/13363* (2006.01)
(52) U.S. Cl.
CPC .................. *G02F 1/13363* (2013.01)
(58) Field of Classification Search
None
See application file for complete search history.

(56) References Cited

U.S. PATENT DOCUMENTS

2009/0316262 A1* 12/2009 Kittaka ............... G02B 5/3041
                                                         359/485.01
2014/0353645 A1  12/2014 Jeong et al.
2018/0045876 A1  2/2018  Lee et al.
2020/0117048 A1* 4/2020  Jeong ................ G02B 6/0051
2022/0004017 A1  1/2022  Choi et al.

FOREIGN PATENT DOCUMENTS

| CN | 101029937 A | 9/2007 |  |
|---|---|---|---|
| CN | 101158778 A | 4/2008 |  |
| CN | 102590921 A | 7/2012 |  |
| CN | 105387384 A * | 3/2016 |  |
| CN | 108427155 A | 8/2018 |  |
| CN | 109212825 A * | 1/2019 | ............. G02B 5/003 |
| CN | 109283730 A * | 1/2019 | ............. G02B 1/04 |
| CN | 111796448 A | 10/2020 |  |
| JP | 5431320 B2 * | 3/2014 | ............. G02B 1/10 |
| TW | 200912206 A | 3/2009 |  |
| TW | 201624075 A | 7/2016 |  |

* cited by examiner

*Primary Examiner* — Paul C Lee
(74) *Attorney, Agent, or Firm* — CKC & Partners Co., LLC

(57) ABSTRACT

An optical film and a display device using the same are provided. The optical film includes a substrate, a first optical layer, a plurality of second optical layers and a third optical layer. The first optical layer is formed on the substrate, in which the first optical layer has an optical structure having a plurality of recesses. The second optical layers formed in the recesses of the optical structure of the first optical layer. The third optical layer covers the first optical layer and the second optical layers. The display device includes a displayer and the optical film, in which the optical film is disposed on the displayer.

17 Claims, 11 Drawing Sheets

OPTICAL FILM COMPRISING A SECOND OPTICAL LAYER HAVING A PLURALITY OF OPTICAL PORTIONS LOCATED IN RECESSES OF A FIRST OPTICAL LAYER AND DISPLAY DEVICE USING THE SAME

BACKGROUND

Field of Invention

The present disclosure relates to an optical film and a display device using the same. More particularly, the present disclosure relates to a wide view angle film and a display device using the same.

Description of Related Art

In recent years, display devices have been widely used in various electronic products, such as personal computers, notebook computers, digital cameras, smart phones, tablet computers, Televisions, etc. The display device, such as a liquid crystal display (LCD) device, has a problem of degraded image quality of a large viewing angle. For example, when a user views images shown by the display device in a large viewing angle, the quality of the images may be degraded due to the large viewing angle.

SUMMARY

An aspect of the present disclosure provides an optical film to solve the above problem of degraded image quality of a large viewing angle. The optical film includes a substrate, a first optical layer, a second optical layer and a third optical layer. The first optical layer is formed on the substrate, in which the first optical layer has an optical structure having a plurality of recesses. The second optical layer is formed on the first optical layer. The third optical layer covers the first optical layer and the second optical layer, in which the third optical layer has an optical structure having a plurality of recesses. The second optical layer is conformal to the first optical layer, or the second optical layer is consisting of a plurality of optical portions located in the recesses.

In some embodiments, the first optical layer has a first refractive index, the second optical layer has a second refractive index and the third optical layer has a third refractive index, and the second refractive index is greater than the first refractive index and the third refractive index.

In some embodiments, the first optical layer has a first refractive index, the second optical layer has a second refractive index and the third optical layer has a third refractive index, and the second refractive index is smaller than the first refractive index and the third refractive index.

In some embodiments, the optical structure of the first optical layer has a height $H_t$, and the second optical layer has a thickness $D_s$, and $0.1 H_t < D_s < 0.8 H_t$.

In some embodiments, the optical structure is a periodic structure.

In some embodiments, the periodic structure is a sine-wave structure.

In some embodiments, the first optical layer, the second optical layer and the third optical layer are resin layers.

Another aspect of the present disclosure provides a display device having the optical film to solve the above problem of degraded image quality of a large viewing angle. The display device includes a displayer and an optical film. The optical film is disposed on the displayer to receive light emitted from the displayer, in which the optical film includes a substrate, a first optical layer, a second optical layer and a third optical layer. The first optical layer is formed on the substrate, in which the first optical layer has an optical structure having a plurality of recesses. The second optical layer is formed on the first optical layer. The third optical layer covers the first optical layer and the second optical layer, in which the third optical layer has an optical structure having a plurality of recesses. The second optical layer is conformal to the first optical layer, or the second optical layer is consisting of a plurality of optical portions located in the recesses.

In some embodiments, the first optical layer has a first refractive index, the second optical layer has a second refractive index and the third r optical layer has a third refractive index, and the second refractive index is greater than the first refractive index and the third refractive index.

In some embodiments, the first optical layer has a first refractive index, the second optical layer has a second refractive index and the third optical layer has a third refractive index, and the second refractive index is smaller than the first refractive index and the third refractive index.

In some embodiments, the optical structure of the first optical layer has a height $H_t$, and the second optical layer has a thickness $D_s$, and $0.1 H_t < D_s < 0.8 H_t$.

In some embodiments, the optical structure is a periodic structure.

In some embodiments, the periodic structure is a sine-wave structure.

In some embodiments, the first optical layer, the second optical layer and the third optical layer are resin layers.

In some embodiments, the optical film receives the light from the displayer through the third optical layer, and the optical film outputs the light from the displayer through the substrate.

In some embodiments, the displayer is a liquid crystal display.

Further another aspect of the present disclosure provides a display device. The display device includes a display panel, a back light module and an optical film. The optical film is disposed between the display panel and the back light module to distribute the light emitted from the back light module. The optical film includes a substrate, a first optical layer, a second optical layer, and a third optical layer. The first optical layer is formed on the substrate, in which the first optical layer has an optical structure having a plurality of recesses. The second optical layer is formed on the first optical layer. The third optical layer covers the first optical layer and the second optical layer, in which the third optical layer has an optical structure having a plurality of recesses. The second optical layer is conformal to the first optical layer, or the second optical layer is consisting of a plurality of optical portions located in the recesses.

In some embodiments, the first optical layer has a first refractive index, the second optical layer has a second refractive index and the third optical layer has a third refractive index, and the second refractive index is greater than the first refractive index and the third refractive index.

In some embodiments, the first optical layer has a first refractive index, the second optical layer has a second refractive index and the third optical layer has a third refractive index, and the second refractive index is smaller than the first refractive index and the third refractive index.

In some embodiments, the optical structure of the first optical layer has a height $H_t$, and the second optical layer has a thickness $D_s$, and $0.1 H_t < D_s < 0.8 H_t$.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
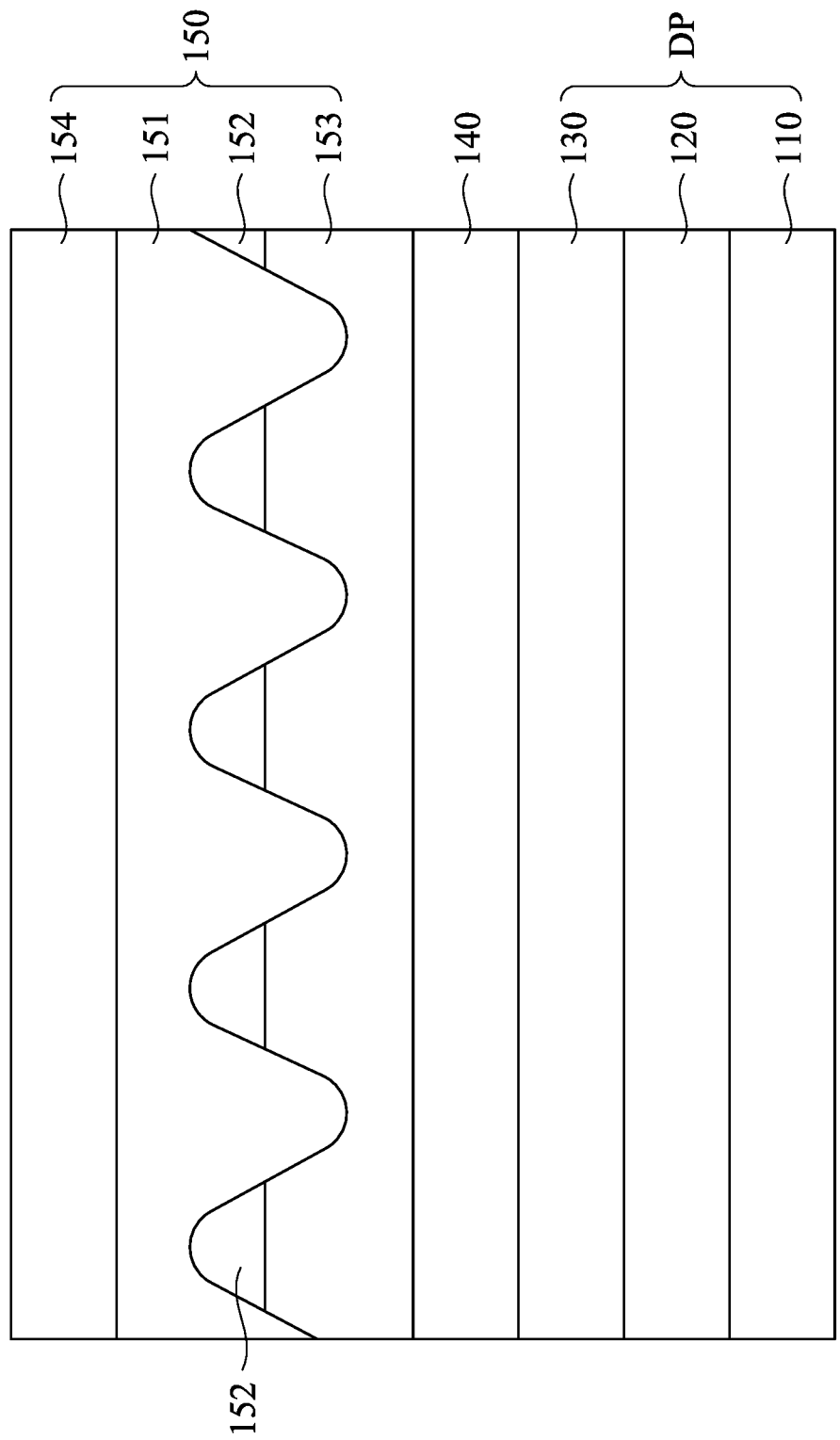
FIG. 1 is a schematic diagram of a display device in accordance with embodiments of the present disclosure.

FIG. 1 is a schematic diagram of a display device 100 in accordance with embodiments of the present disclosure. In the display device 100, a displayer DP having a display panel 110, a first adhesive layer 120 and a polarizer layer 130 is configured to provide images, and a second adhesive layer 140 and an optical film 150 are disposed on the displayer DP. In this embodiment, the displayer DP is a liquid crystal display (LCD). For example, the displayer DP is a twisted nematic (TN) liquid crystal display panel or a super twisted nematic (STN) liquid crystal display panel. However, the embodiments of the present disclosure are not limited thereto. In some embodiments, the displayer DP may be a plasma display (PDP), an organic light-emitting diode display (OLED display), a small-pitch display (MiniLED display), a micro-light-emitting diode displays (MicroLED display), an electronic paper display configured to display images.

The polarizer layer 130 is disposed on the liquid crystal display panel 110. In this embodiment, the first adhesive layer 120 is disposed between the polarizer layer 130 and the liquid crystal display panel 110 to fix the polarizer layer 130. However, embodiments of the present disclosure are not limited thereto. In some embodiments, the polarizer layer 130 can be fixed on the liquid crystal display panel 110 by using a particular mechanism, for example a displayer frame. Therefore, the first adhesive layer 120 can be omitted.

The optical film 150 is disposed on the polarizer layer 130. In other words, the polarizer layer 130 is disposed between the optical film 150 and the liquid crystal display panel 110. Similarly, the second adhesive layer 140 is disposed between the polarizer layer 130 and the optical film 150 to fix the optical film 150. The optical film 150 includes a first optical layer 151, a second optical layer 152, a third optical layer 153 and a substrate 154.

In some embodiments, the first optical layer 151, the second optical layer 152, and the third optical layer 153 may independently be a viscoelastic or elastic adhesive, such as pressure sensitive adhesive (PSA), rubber-based adhesive and polysiloxane-based adhesive. Examples of viscoelastic or elastic adhesives include an elastic polyurethane-based adhesive or a polysiloxane-based adhesive, a styrene-block-copolymer-based adhesive, a (meth) acrylic-block-copolymer-based adhesive, a polyvinyl ether-based adhesive, a polyolefin-based adhesive, and a polymethacrylate-based adhesive.

In some embodiments, the first optical layer 151, the second optical layer 152, and the third optical layer 153 may be resin layers. Examples of the material of the resin layers may include thermosetting resin or UV curing resin formed of such as (methyl) acrylic, urethane, (meth) acrylic urethane, epoxy, or polyoxyn.

The first optical layer 151 is formed on the substrate 154. The first optical layer 151 has an optical structure. In this embodiment, the optical structure is a periodic structure, such as a sine-wave structure having troughs (recesses). The second optical layer 152 has a plurality of optical portions disposed in the recesses of the first optical layer 151. The third optical layer 153 is formed on the first optical layer 151 and the second optical layer 152. Specifically, the third optical layer 153 coves the first optical layer 151 and the second optical layer 152, and has an optical structure having recesses (corresponding to protrusions of the first optical layer 151). As shown in FIG. 1, the third optical layer 153 is disposed adjacent to the displayer DP, and the first optical layer 151 is disposed away from the displayer DP.

Figure 2:
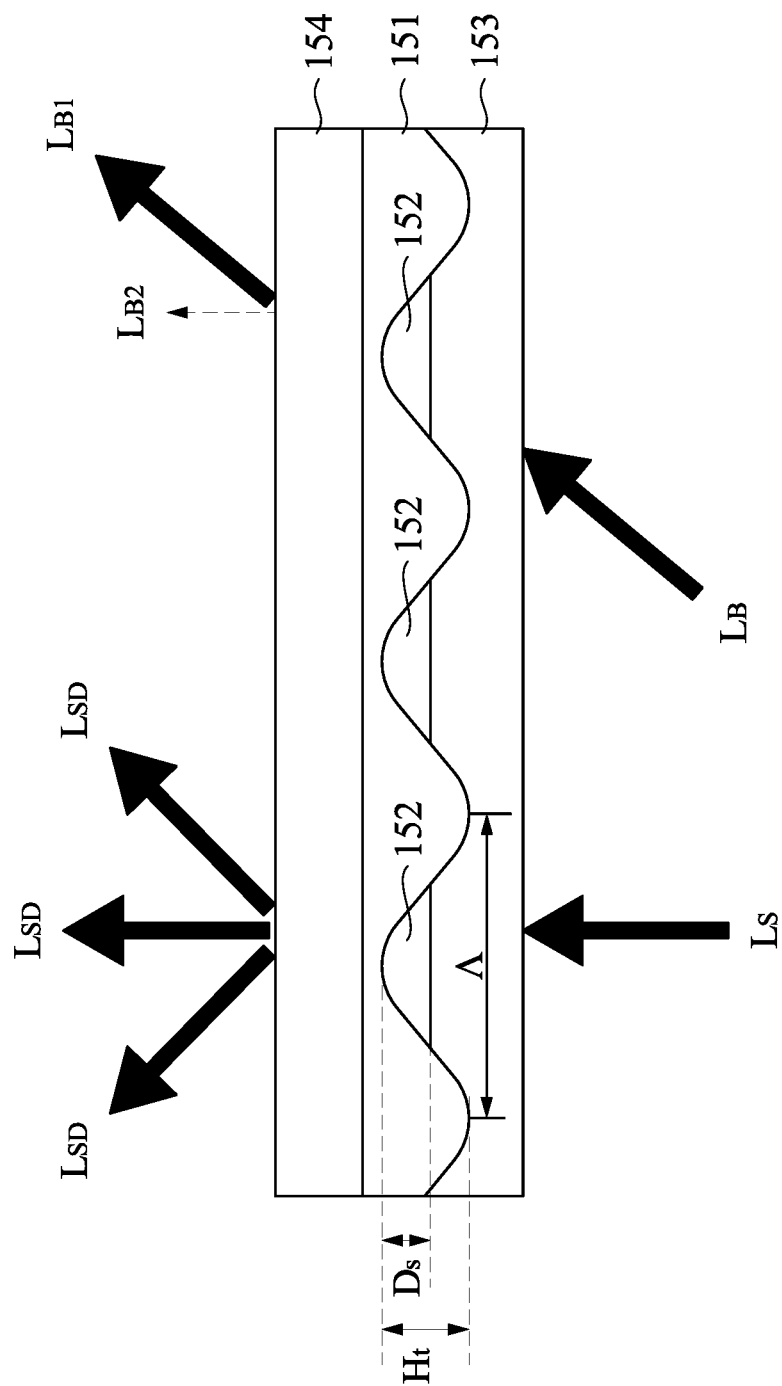
FIG. 2 is a schematic diagram showing light distributions of the light from the displayer to the optical film in accordance with embodiments of the present disclosure.

FIG. 2 is a schematic diagram showing light distributions of the light from the displayer DP to the optical film 150 in accordance with embodiments of the present disclosure. In the embodiments of the present disclosure, the problem of degraded image quality of a large viewing angle is solved by providing the optical film 150. The optical film 150 acts as a wide view angle film to solve the problem of degraded image quality of a large viewing angle.

As shown in FIG. 2, the optical film 150 receives the light from the displayer DP through the third optical layer 153, and the optical film 150 outputs the light from the displayer DP through the substrate 154. In other words, the light from the displayer DP enters the optical film 150 through the third optical layer 153, and exits the optical film 150 through the substrate 154. For example, the center viewing angle light Ls of the displayer DP enters the optical film 150 through the third optical layer 153, and then the center viewing angle light Ls is separated into lights $L_{SD}$ exiting the optical film 150 through the substrate 154, and compensation for image quality of the large viewing angle is achieved by the lights $L_{SD}$. For another example, the side viewing angle light $L_B$ of the displayer DP enters the optical film 150 through the third optical layer 153, and then the side viewing angle light $L_B$ is separated into lights $L_{B1}$ and $L_{B2}$ exiting the optical film 150 through the substrate 154. The optical film 150 is capable of uniformly separating the center viewing angle light Ls into lights $L_{SD}$, and greatly reducing the strength of the light $L_{B2}$ corresponding to the center viewing angle of the display device 100. Details of the optical film 150 are described below.

It is assumed that the optical structure of the first optical layer 151 has a height $H_t$, each of the optical portions of the second optical layer 152 has a thickness $D_s$. In the embodiments of the present disclosure, the height $H_t$ and the thickness $D_s$ are designed to satisfy a relationship: $0.1 H_t < D_s < 0.8 H_t$. Further, the first optical layer 151 has a first refractive index n1, the second optical layer 152 has a second refractive index n2 and the third optical layer 153 has a third refractive index n3. In some embodiments of the present disclosure, the second refractive index n2 is greater than the first refractive index n1 and the third refractive index n3. In some embodiments, the second refractive index n2 is smaller than the first refractive index n1 and the third refractive index n3.

Figure 3A:
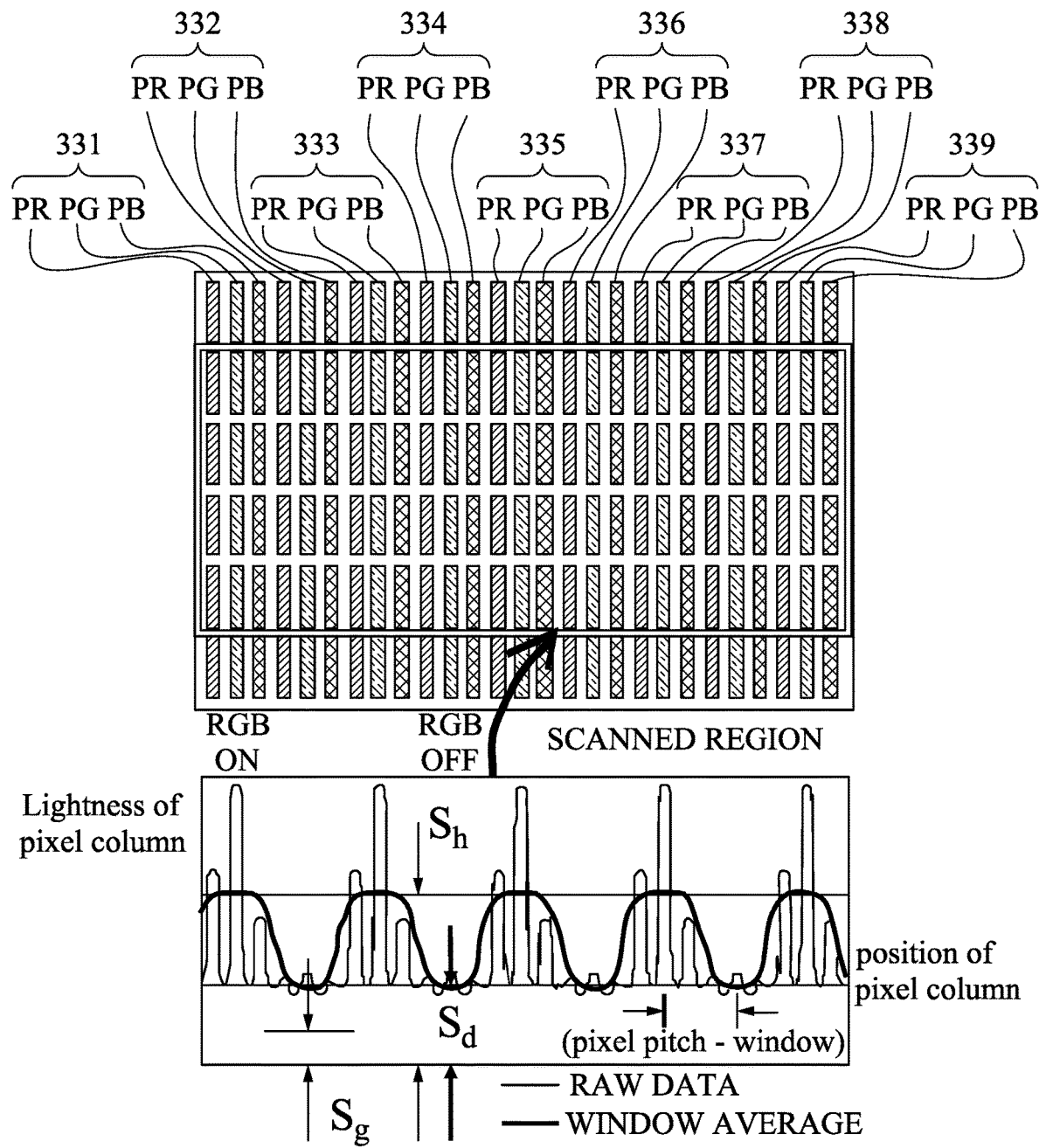
FIG. 3A is a schematic diagram showing the parameters of the contrast modulation in accordance with embodiments of the present disclosure.
Figure 3B:
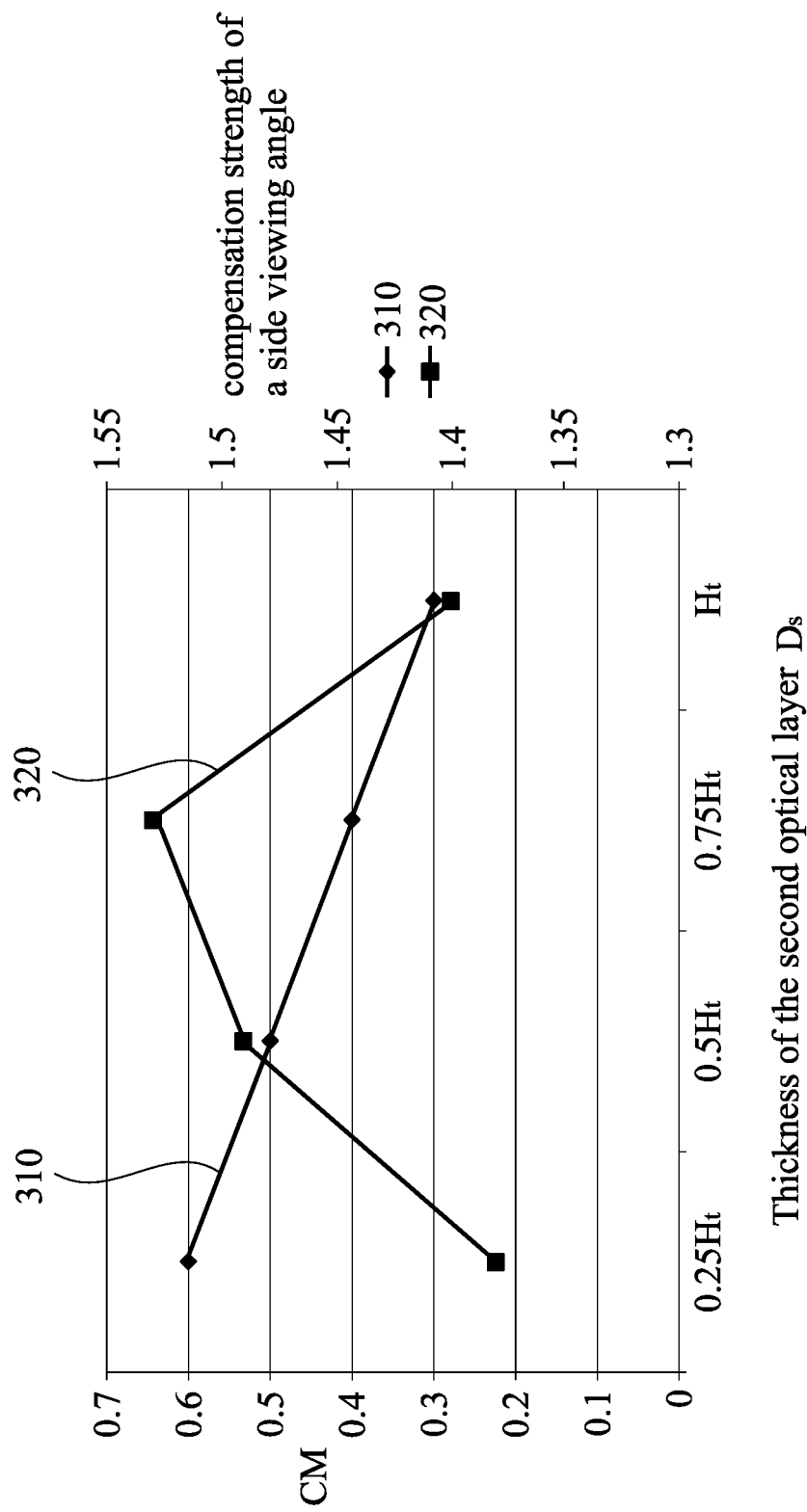
FIG. 3B is a schematic diagram showing a curve of the contrast modulation (CM) of the display device and a curve of the compensation strength of side viewing angle of the display device in accordance with embodiments of the present disclosure.

Referring to FIG. 3A and FIG. 3B, FIG. 3A is a schematic diagram showing the parameters of the contrast modulation, and FIG. 3B is a schematic diagram showing a curve 310 of the contrast modulation (CM) of the display device 100 and a curve 320 of the compensation strength of side viewing angle of the display device 100 in accordance with embodiments of the present disclosure. As shown in FIG. 3A, red pixels PR, green pixels PG and blue pixels PB are arranged in a matrix including pixel groups 331-339 each having one column of red pixels PR, one column of green pixels PG and one blue pixels. The pixel groups 331, 333, 335, 337 and 339 are turned on, and the pixel groups 332, 334, 336, and 338 are turned off for calculation of the contrast modulation. In the embodiments of the present disclosure, the contrast modulation can be represented by the following equation:

$$S_W = S_h - S_g$$
$$S_K = S_d - S_d$$
$$C_G = S_W / S_b$$
$$C_m = \frac{S_W - S_K}{S_W + S_K}$$

, where
$S_g$ = glare correction
$S_h$ = white line average(high)
$S_d$ = black line average(dim)
$S_W$ = net white value
$S_K$ = net black value
$C_G$ = grille contrast
$C_m$ = Michelson contrast or contrast modulation As shown in FIG. 3B, the contrast modulation (CM) and the compensation strength of side viewing angle of the display device 100 are in associated with the thickness $D_s$ of the second optical layer 152.

For example, when the thickness $D_s$ of the second optical layer 152 is substantially equal to $0.25 H_t$, the contrast modulation of the display device 100 is substantially equal to 0.6. When the thickness $D_s$ of the second optical layer 152 is increased to be substantially equal to $H_t$, the contrast modulation of the display device 100 is substantially equal to 0.3. In other words, when the thickness $D_s$ of the second optical layer 152 is increased, the contrast modulation of the display device 100 is decreased, and thus the words or characters shown by the display device 100 may get blurred.

For another example, when the thickness $D_s$ of the second optical layer 152 is substantially equal to $0.25 H_t$, the compensation strength of side viewing angle of the display device 100 approximates 0.2. When the thickness $D_s$ of the second optical layer 152 is increased to be substantially equal to $0.75 H_t$, the compensation strength of side viewing angle of the display device 100 is substantially equal to a maximum value approximately 0.65. In other words, in the section from $0.25 H_t$ to $0.75 H_t$, the image quality of the large viewing angle of the display device 100 is increased when the thickness $D_s$ of the second optical layer 152 is increased. And then the compensation strength of side viewing angle of the display device 100 is decreased to 0.3, when the thickness $D_s$ of the second optical layer 152 is increased to be substantially equal to $H_t$.

Therefore, in the embodiments of the invention, the height $H_t$ and the thickness $D_s$ are designed to satisfy the relationship: $0.1 H_t < D_s < 0.8 H_t$ for balance of the CM and the compensation strength of side viewing angle of the display device 100. In other words, the user can obtain better image quality of large viewing angle when the above relationship is achieved.

In this embodiment, the grating period $\Lambda$ is designed to be 4 micrometer (um), the first refractive index n1 of the first optical layer 151 is designed to be 1.49, the second refractive index n2 of the second optical layer 152 is designed to be 1.65, the third refractive index n3 of the third optical layer 153 is designed to be 1.5, and the thickness $D_s$ is designed to be $0.5 H_t$. However, embodiments of the present disclosure are not limited thereto.

Figure 4:
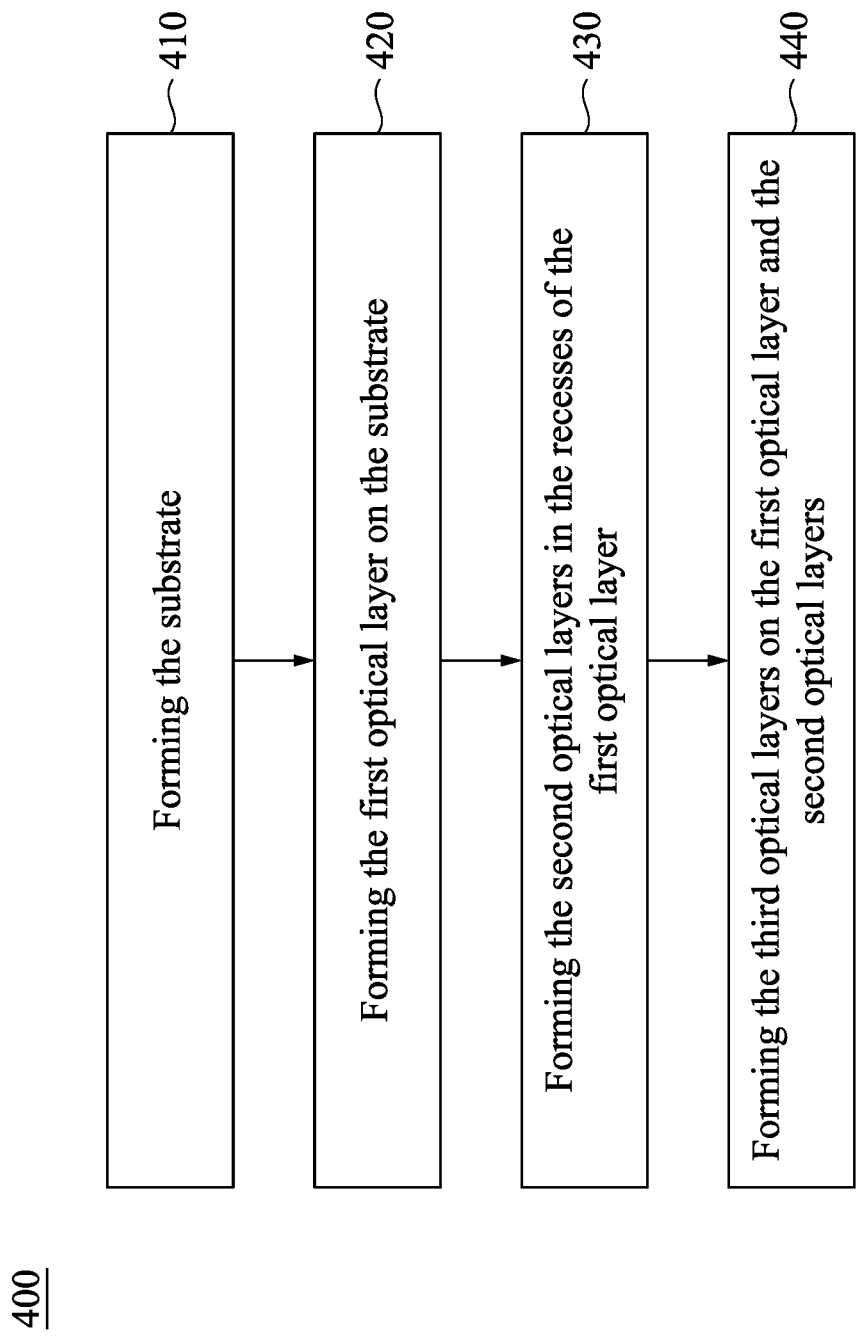
FIG. 4 is a schematic diagram showing a flowchart of a fabrication method of the optical film in accordance with embodiments of the present disclosure.
Figure 5A:
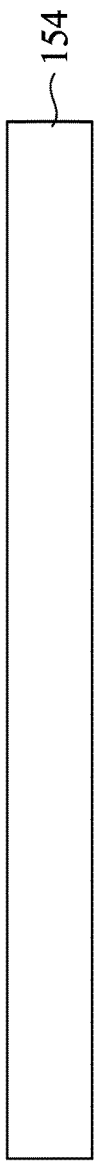
FIGS. 5A-5E are schematic diagrams showing intermediate stages of the fabrication method of the optical film.
Figure 5B:
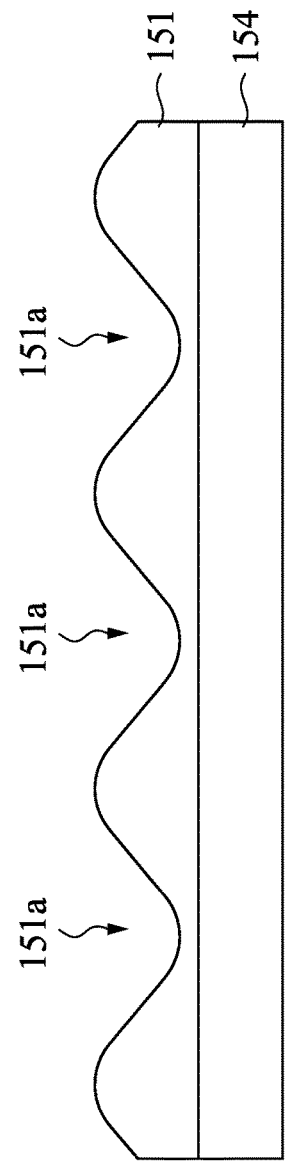

FIG. 4 is a schematic diagram showing a flowchart of a fabrication method 400 of the optical film 150 in accordance with embodiments of the present disclosure. In the fabrication method 400, at first, step 410 is performed to form the substrate 154, as shown in FIG. 5A. The substrate 154 can be a resin layer. Examples of the material of the resin layer may include thermosetting resin or UV curing resin formed of such as (methyl) acrylic, urethane, (meth) acrylic urethane, epoxy, or polyoxyn. Then, step 420 is performed to form the first optical layer 151 on the substrate 154, as shown in FIG. 5B. In some embodiments, the material of the first optical layer 151 can be coated on the substrate 154, and then a manufacturing process such as photolithography, engraving, embossing, transferring or printing is performed on the material of the first optical layer 151 to form the periodic structure (for example, the sine wave structure) of the first optical layer 151 which has plural recesses 151a.

Figure 5C:
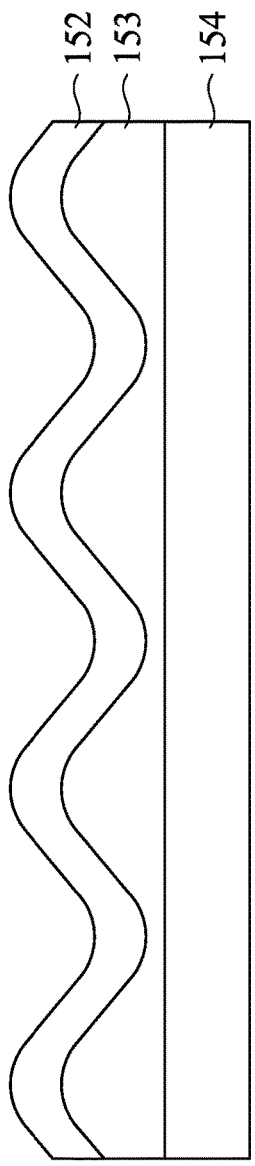
Figure 5D:
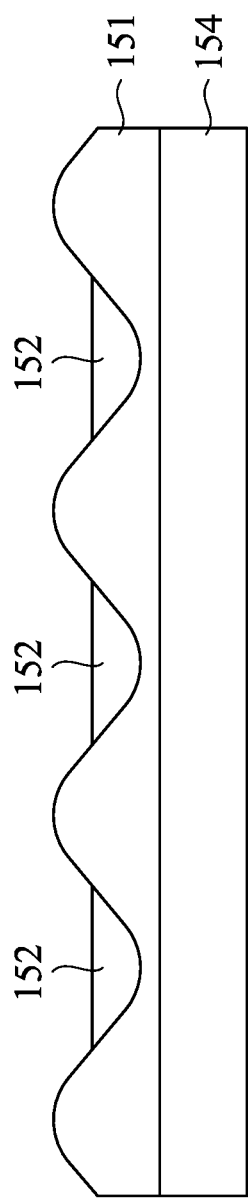

Thereafter, step 430 is performed to form the second optical layer 152 in the recesses 151a of the first optical layer 151. As shown in FIG. 5C, the second optical layer 152 is conformal to the first optical layer 151 when the material of the second optical layer 152 is coated on the first optical layer 151. In this embodiment, since the material of the second optical layer 152 has a small viscosity (for example, the viscosity of the material of the second optical layer 152 is smaller than 30 cps), the second optical layer 152 is separated into a plurality of optical portions when a specific time period passes, as shown in FIG. 5D.

Figure 5E:
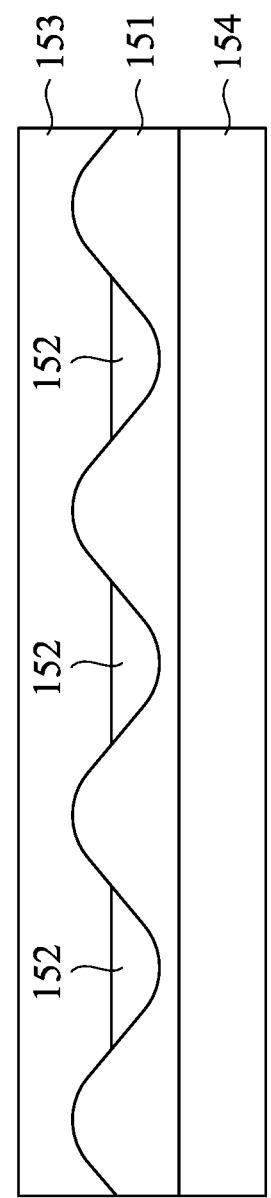

Then, step 440 is performed to form the third optical layer 153 on the first optical layer 151 and the second optical layer 152 to cover the first optical layer 151 and the second optical layer 152, as shown in FIG. 5E.

It can be understood that the optical film 150 is provided to improve solve the problem of degraded image quality of a large viewing angle (side viewing angle). The optical film 150 is designed to include at least the first optical layer 151 having a first refractive index n1, the second optical layer 152 having a second refractive index n2 and the third optical layer 153 having a third refractive index n3. In some embodiments of the present disclosure, the second refractive index n2 is greater than the first refractive index n1 and the third refractive index n3. In some embodiments, the second refractive index n2 is smaller than the first refractive index n1 and the third refractive index n3. The second optical layer 152 are formed in the recesses of the first optical layer 151, and the height $H_t$ of the recess and the thickness $D_s$ of the second optical layer 152 are designed to satisfy the relationship: $0.1H_t < D_s < 0.8H_t$ for balance of the CM and the compensation strength of side viewing angle. Also, the image quality of a side viewing angle is not degraded.

Figure 6:
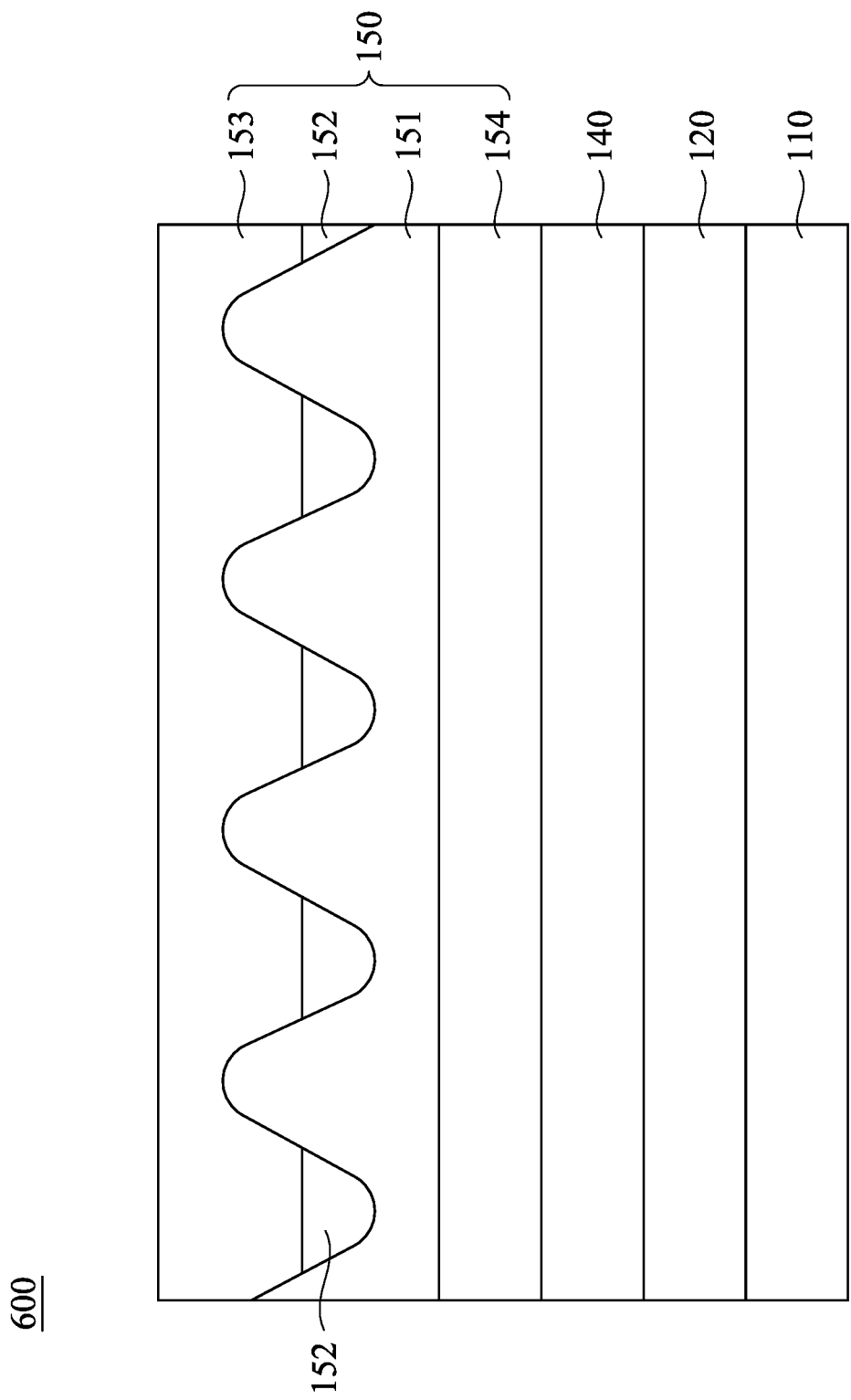
FIG. 6 is a schematic diagram of a display device in accordance with embodiments of the present disclosure.

FIG. 6 is a schematic diagram of a display device 600 in accordance with embodiments of the present disclosure. The display device 600 is similar to the display 100, but the difference is in that the optical film 150 is disposed upside-down. Specifically, the substrate 154 is located adjacent to the second adhesive layer 140, and the substrate 154 is located away from the second adhesive layer 140. Although the optical film 150 is disposed upside-down, the function of the optical film 150 is not affected by this arrangement. Therefore, the image quality of the display device 600 is as good as the image quality of the display device 100.

Figure 7:
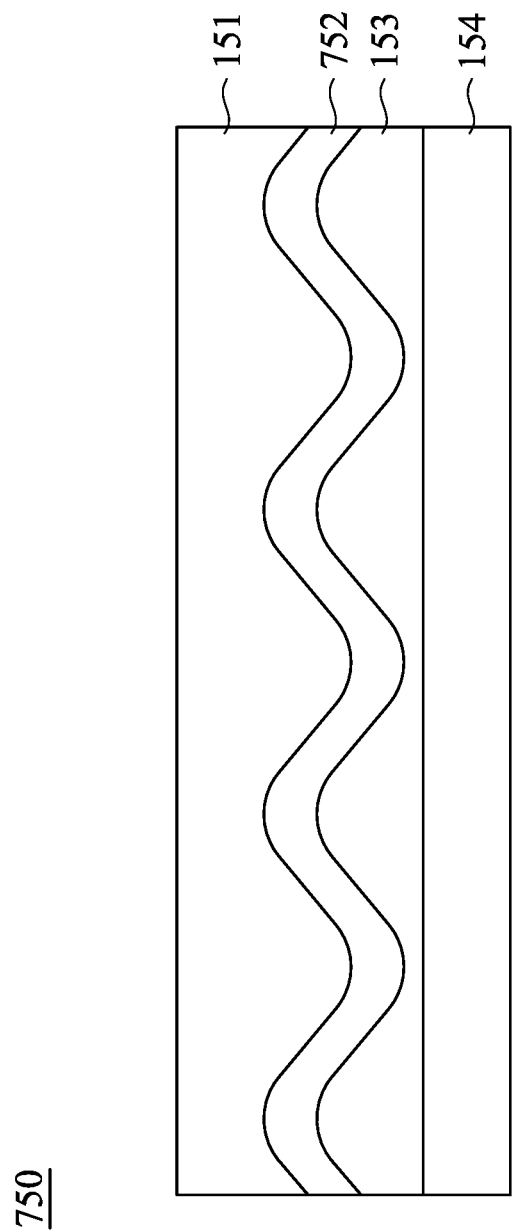
FIG. 7 is a schematic diagram showing a structure of an optical film in accordance with embodiments of the present disclosure.

FIG. 7 is a schematic diagram showing a structure of an optical film 750 in accordance with embodiments of the present disclosure. The optical film 750 includes the first optical layer 151, a second optical layer 752, the third optical layer 153 and the substrate 154. The optical film 750 is similar to the optical film 150, but the difference is in that the second optical layer 152 recesses of the first optical layer 151 is replaced by second optical layer 752 conformal to the first optical layer 151.

Figure 8:
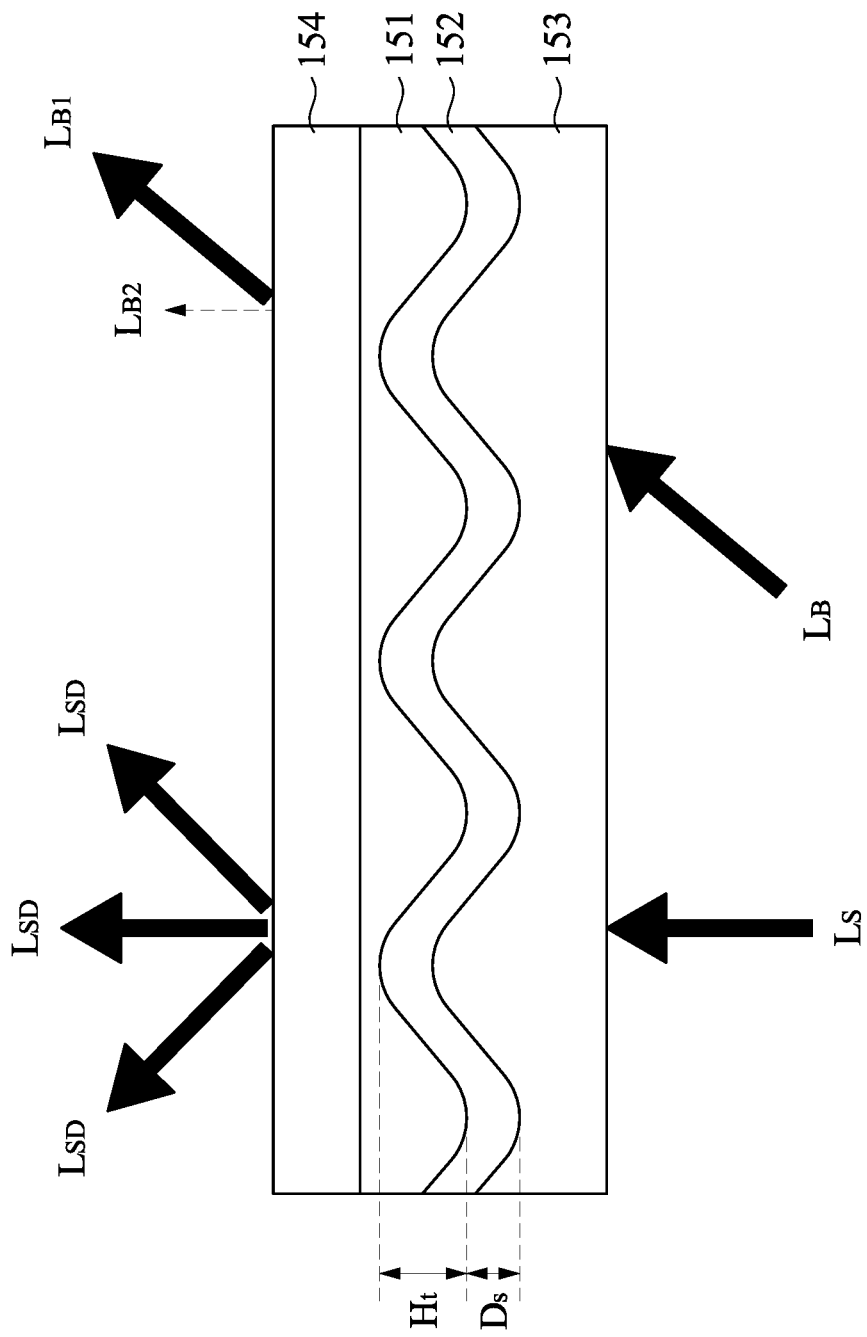
FIG. 8 is a schematic diagram showing light distributions of the light from the displayer to the optical film in accordance with embodiments of the present disclosure.

The function of the optical film 750 is similar to that of the optical film 150. For example, as shown in FIG. 8, the optical film 750 receives the light from the displayer DP through the third optical layer 153, and the optical film 750 outputs the light from the displayer DP through the substrate 154. In other words, the light from the displayer DP enters the optical film 750 through the third optical layer 153, and exits the optical film 750 through the substrate 154. Specifically, the center viewing angle light Ls of the displayer DP enters the optical film 750 through the third optical layer 153, and then the center viewing angle light Ls is separated into lights $L_{SD}$ exiting the optical film 750 through the substrate 154, and compensation for image quality of the large viewing angle is achieved by the lights $L_{SD}$. For another example, the side viewing angle light $L_B$ of the displayer DP enters the optical film 750 through the third optical layer 153, and then the side viewing angle light $L_B$ is separated into lights $L_{B1}$ and $L_{B2}$ exiting the optical film 750 through the substrate 154. The optical film 750 is capable of uniformly separating the center viewing angle light Ls into lights $L_{SD}$, and greatly reducing the strength of the light $L_{B2}$ corresponding to the center viewing angle of the display device 100. Details of the optical film 750 are described below.

It is assumed that the optical structure of the first optical layer 151 has the height $H_t$, and the second optical layer 752 has the thickness $D_s$. In the embodiments of the present disclosure, the height $H_t$ and the thickness $D_s$ are designed to satisfy a relationship: $0.1 H_t < D_s < 0.8 H_t$. Further, the first optical layer 151 has the first refractive index n1, the second optical layer 752 has the second refractive index n2 and the third optical layer 153 has the third refractive index n3. Similar to the optical film 150, the second refractive index n2 is greater than the first refractive index n1 and the third refractive index n3, or the second refractive index n2 is smaller than the first refractive index n1 and the third refractive index n3.

The fabrication method of the optical film 750 is also similar to fabrication method 400 of the optical film 150, but the difference is in that the optical film 750 has a big viscosity (for example, the viscosity of the material of the second optical layer 152 is bigger than or equal to 30 cps), and thus the optical film 750 maintain a shape conformal to the first optical layer when the specific time period passes.

Figure 9:
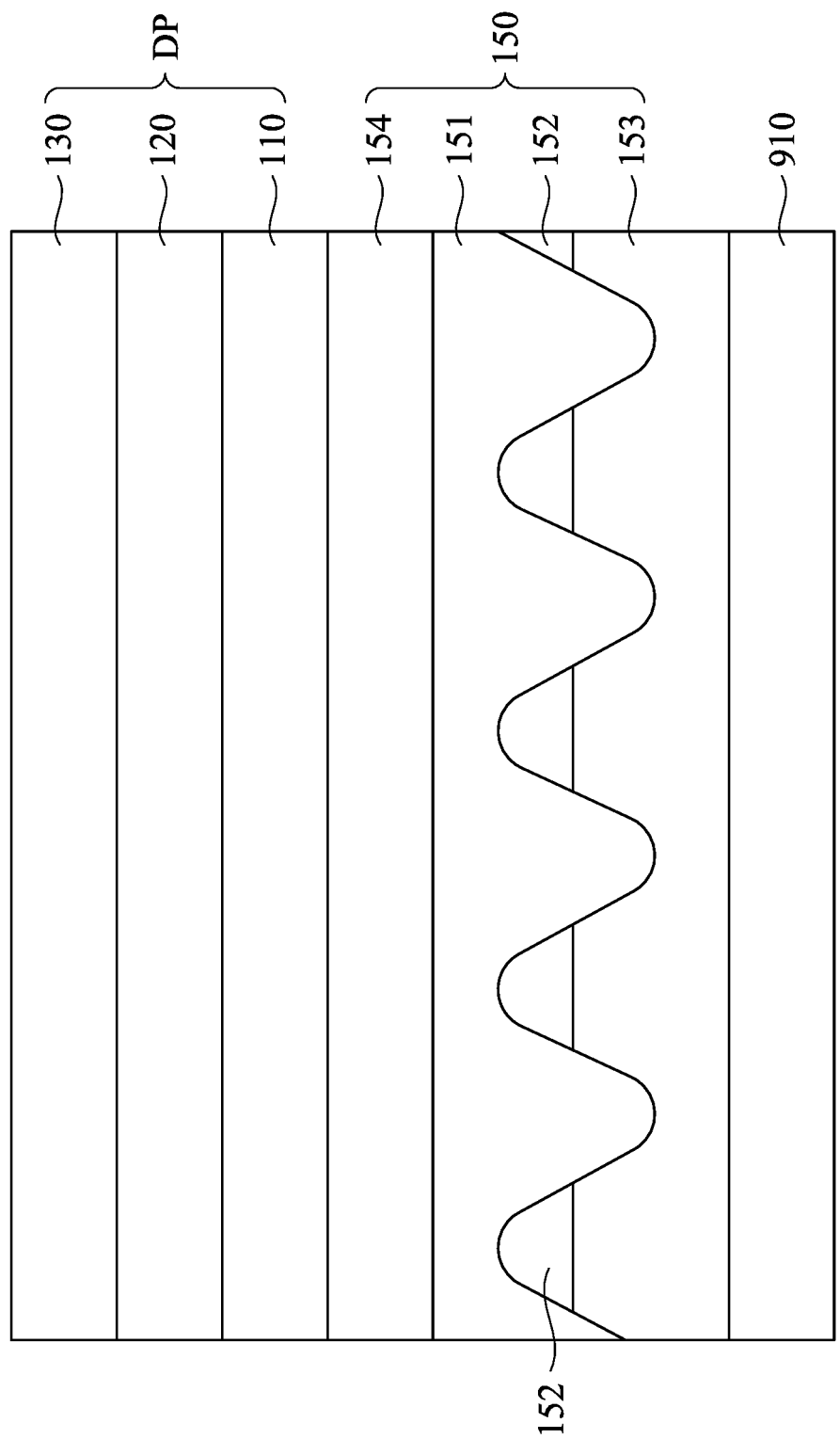
FIG. 9 is a schematic diagram of a display device in accordance with embodiments of the present disclosure.

FIG. 9 is a schematic diagram of a display device 900 in accordance with embodiments of the present disclosure. The display device 900 includes the display panel 110, the first adhesive layer 120, the polarizer layer 130, the optical film 150 and a backlight module 910. In this embodiment, the optical film 150 is disposed between the backlight module 910 the display panel 110, and thus the light provided by the backlight module 910 to the display panel 110 can be distributed by the optical film 150 to have high front brightness and achieve better backlight quality.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical film, comprising:
   a substrate;
   a first optical layer formed on the substrate, wherein the first optical layer has an optical structure having a plurality of recesses;
   a second optical layer formed on the first optical layer; and
   a third optical layer covering the first optical layer and the second optical layer, wherein the third optical layer has an optical structure having a plurality of recesses;
   wherein the second optical layer is consisting of a plurality of optical portions located in the recesses of the first optical layer;
   wherein the optical structure of the first optical layer has a height Ht, and the second optical layer has a thickness Ds, and 0.1 Ht<Ds<0.8 Ht; and
   wherein the optical film receives a center viewing angle light and a side viewing angle light, and the center viewing angle light is separated into a plurality of lights radially exiting the optical film through the substrate, and compensation for image quality of a large viewing angle is achieved by the lights, wherein the side viewing angle light is separated into first and second lights exiting the optical film through the substrate, wherein the first light is obliquely emitted, the second light is emitted corresponding to the center viewing angle of a display device, and strength of the second light is greatly reduced by the optical film.

2. The optical film of claim 1, wherein the first optical layer has a first refractive index, the second optical layer has a second refractive index and the third optical layer has a third refractive index, and the second refractive index is greater than the first refractive index and the third refractive index.

3. The optical film of claim 1, wherein the first optical layer has a first refractive index, the second optical layer has a second refractive index and the third optical layer has a third refractive index, and the second refractive index is smaller than the first refractive index and the third refractive index.

4. The optical film of claim 1, wherein the optical structure is a periodic structure.

5. The optical film of claim 4, wherein the periodic structure is a sine-wave structure.

6. The optical film of claim 1, wherein the first optical layer, the second optical layer and the third optical layer are resin layers.

7. A display device, comprising:
a displayer; and
an optical film disposed on the displayer to receive light emitted from the displayer, wherein the optical film comprises:
a substrate;
a first optical layer formed on the substrate, wherein the first optical layer has an optical structure having a plurality of recesses;
a second optical layer formed on the first optical layer; and
a third optical layer covering the first optical layer and the second optical layer, wherein the third optical layer has an optical structure having a plurality of recesses;
wherein the second optical layer is consisting of a plurality of optical portions located in the recesses of the first optical layer;
wherein the optical structure of the first optical layer has a height Ht, and the second optical layer has a thickness Ds, and 0.1 Ht<Ds<0.8 Ht; and
wherein the optical film receives a center viewing angle light and a side viewing angle light from the displayer, and the center viewing angle light is separated into a plurality of lights radially exiting the optical film through the substrate, and compensation for image quality of a large viewing angle is achieved by the lights, wherein the side viewing angle light is separated into first and second lights exiting the optical film through the substrate, wherein the first light is obliquely emitted, the second light is emitted corresponding to the center viewing angle of the display device, and strength of the second light is greatly reduced by the optical film.

8. The display device of claim 7, wherein the first optical layer has a first refractive index, the second optical layer has a second refractive index and the third optical layer has a third refractive index, and the second refractive index is greater than the first refractive index and the third refractive index.

9. The display device of claim 7, wherein the first optical layer has a first refractive index, the second optical layer has a second refractive index and the third optical layer has a third refractive index, and the second refractive index is smaller than the first refractive index and the third refractive index.

10. The display device of claim 7, wherein the optical structure is a periodic structure.

11. The display device of claim 10, wherein the periodic structure is a sine-wave structure.

12. The display device of claim 7, wherein the first optical layer, the second optical layer and the third optical layer are resin layers.

13. The display device of claim 7, wherein the optical film receives the light from the displayer through the third optical layer, and the optical film outputs the light from the displayer through the substrate.

14. The display device of claim 7, wherein the displayer is a liquid crystal display.

15. A display device, comprising:
a display panel;
a back light module configured to emit a center viewing angle light and a side viewing angle light to the display panel; and
an optical film disposed between the display panel and the back light module to distribute the center viewing angle light emitted from the back light module, wherein the optical film comprises:
a substrate;
a first optical layer formed on the substrate, wherein the first optical layer has an optical structure having a plurality of recesses;
a second optical layer formed on the first optical layer; and
a third optical layer covering the first optical layer and the second optical layer, wherein the third optical layer has an optical structure having a plurality of recesses;
wherein the second optical layer is consisting of a plurality of optical portions located in the recesses of the first optical layer;
wherein the optical structure of the first optical layer has a height Ht, and the second optical layer has a thickness Ds, and 0.1 Ht<Ds<0.8 Ht; and
wherein the optical film receives the center viewing angle light and the side viewing angle light emitted from the back light module, and the center viewing angle light is separated into a plurality of lights radially exiting the optical film through the substrate, and compensation for image quality of a large viewing angle is achieved by the lights, wherein the side viewing angle light is separated into first and second lights exiting the optical film through the substrate, wherein the first light is obliquely emitted, the second light is emitted corresponding to the center viewing angle of the display device, and strength of the second light is greatly reduced by the optical film.

16. The display device of claim 15, wherein the first optical layer has a first refractive index, the second optical layer has a second refractive index and the third optical layer has a third refractive index, and the second refractive index is greater than the first refractive index and the third refractive index.

17. The display device of claim 15, wherein the first optical layer has a first refractive index, the second optical layer has a second refractive index and the third optical layer has a third refractive index, and the second refractive index is smaller than the first refractive index and the third refractive index.

* * * * *